Figure 1:
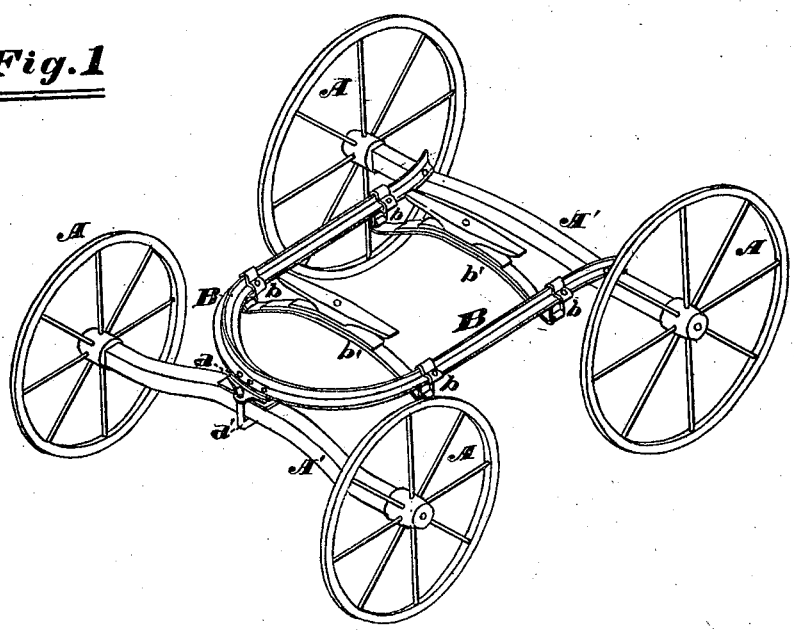

F. P. STONE.
SIDE-BAR VEHICLE.

No. 185,196. Patented Dec. 12, 1876.

Witnesses:
C. A. Stone
C. A. Stone

Inventor:
Frank P. Stone.

UNITED STATES PATENT OFFICE.

FRANK P. STONE, OF CHICAGO, ILLINOIS.

IMPROVEMENT IN SIDE-BAR VEHICLES.

Specification forming part of Letters Patent No. 185,196, dated December 12, 1876; application filed April 1, 1876.

*To all whom it may concern:*

Be it known that I, FRANK P. STONE, of the city of Chicago, in the county of Cook and State of Illinois, have invented certain new and useful Improvements in Vehicles; and I do hereby declare the following to be a full, clear, and exact description thereof, which will enable others skilled in the art to which my invention relates to make and use the same, reference being had to the accompanying drawing, forming part of this specification, in which—

Figure 1 is a perspective of the running-gear of a vehicle embodying my improvement.

My invention consists in the peculiar construction and application of wood or metal side bars and reaches, combined with and connecting both axles.

The object of my invention is to construct a cheap, durable, and efficient vehicle, and it will be observed that I dispense with many pieces that are generally used in the construction of vehicles, and consequently the weight and expense of the same are considerably lessened, and at the same time a more substantial and durable article produced.

In the accompanying drawing, A represents the ordinary wheels of a vehicle; A', the axles of the same. B represents my improved combination of side bar and reach, or reaches of one piece of wood or metal, bent or formed so as to connect both axles, (and in this instance) is a T-shaped bar, formed in the shape of the letter U, so that when in position upon the axles the flat or broadest part of the bar comes upon the same.

$a$ is a piece of wood provided with a metal face, which acts as a rocker-iron on the axle. The head of the king-bolt is sunk into the wood, and then the piece is secured to the under side of the bar, which holds the bolt firmly in position and prevents rattling. The bolt then passes through the axle in the ordinary manner. The opposite ends of the bar are secured to the rear axle.

$a'$ is a safety-clip passing under the front axle, the ends being secured to the bar or wooden block between rocker-plate and the bar, so that in case the king-bolt breaks the clip will prevent the front axle from drawing from under the box. $b\ b$ are stirrups secured to the under side of the bar, and receiving the ends of the springs $b'\ b'$.

It is plain to be seen that a vehicle constructed in this manner consumes less time and material in its construction than by the ordinary manner.

Having thus described my invention, what I claim as new, and desire to secure by Letters Patent, is—

As an improvement in the construction of vehicles, the bent bar B, for connecting the front and rear axles and supporting the body, substantially as set forth.

The above specification signed by me this 18th day of November, 1875.

FRANK P. STONE.

Witnesses:
R. D. INGERSOLL,
S. J. STOW.